United States Patent [19]

Tuninetti

[11] 4,023,870
[45] May 17, 1977

[54] SELF-CENTERING DEVICE TO FASTEN A ROTATORY WHEEL AGAINST AXIAL MOVEMENTS

[75] Inventor: Domenico Tuninetti, Rome, Italy

[73] Assignee: SPEM: Societa Prodotti Elettronici Meccanici, Rome, Italy

[22] Filed: Jan. 8, 1976

[21] Appl. No.: 647,597

[30] Foreign Application Priority Data

Jan. 15, 1975 Italy .................................. 47699/75

[52] U.S. Cl. .......................................... 308/237 R
[51] Int. Cl.² ........................................ F16C 17/00
[58] Field of Search ............. 308/237 R, 237 A, 33; 226/179, 188, 190, 194

[56] References Cited

UNITED STATES PATENTS 3,754,696  8/1973  Rietbergen .................... 226/194 X Primary Examiner—Joseph F. Peters, Jr.
Assistant Examiner—Gene A. Church

[57] ABSTRACT

A device for centering and fastening a flywheel of a cassette-type recorder to the wall of the recorder housing, comprising a cylindrical sleeve connected to said flywheel and having an annular member with a torus-shaped periphery fixed on said sleeve, a bush mounted on said wall having an inner cylindrical surface of such diameter and axial extension to receive said sleeve and annular member, and resilient retaining means mounted on said bush and protruding from said inner cylindrical surface, said retaining means having a diameter less than said torus-shaped periphery capable of resiliently yielding to allow said periphery to pass when the latter is forced against said retaining means by an axially directed force, and snapping again into its protruding position after said periphery is passed.

4 Claims, 3 Drawing Figures

SELF-CENTERING DEVICE TO FASTEN A ROTATORY WHEEL AGAINST AXIAL MOVEMENTS

This application relates to a self-centering device to fasten a rotating wheel in its bush against axial movements and, more particularly, to such a device as applied to the flywheel in magnetic tape recorders of the cassette type.

At present, stabilizing flywheels included in cassette-type tape recorders are fastened against axial movements by a backing plate which is fixed externally to one of the walls enclosing the internal mechanisms of the tape recorder, with the backing plate spaced from this wall by two spacers.

This arrangement is complicated and results in increased manufacturing costs, owing both to the increased number of parts required and manual operations involved in assembling the same.

Moreover, such arrangement is very bulky as it results in an increase of 4 to 5 mm of the overall thickness of the recorder, while, specially for portable cassette-type tape recorders or for those intended to be installed in motor vehicles, there is the critical necessity of reducing to a minimum the overall dimensions of the recorder.

This invention provides a device that self-centers and fastens against axial movements a rotating wheel or, more particularly, a flywheel of a cassette-type tape recorder, the use of which allows the elimination of any auxiliary members or elements fastening the rotating wheel externally to the recorder housing. More particularly, the outer backing-plates heretofore used in cassette type tape recorders are eliminated without generating any undue friction on the flywheel shaft.

Accordingly, it is an object of this invention to provide a device that self-centers and fastens any rotating elements against axial movements.

It is a more particular object to provide a device that self-centers and fastens against axial movements the flywheel of cassette-type tape recorders.

According to the invention a protruding bush is fixed to the wall of the recorder housing supporting the wheel to be fastened against axial movements, this bush having a stepped cylindrical inner surface comprising portions of different diameters to form steps and annular surfaces of increasing diameter, with an annular groove formed in the cylindrical surface of the bush outermost portion having the largest diameter.

The base of the hub or shaft of the wheel is enlarged and a disc is connected thereto having the outer periphery torus shaped.

A split O-ring of spring steel, acting as a circlip, is received in said groove; the O-ring diameter and groove depth being such that the O-ring protrudes from the groove by half of its thickness, when received in the groove.

The diameter of said torus-shaped outer periphery of the disc is slightly larger that the inner diameter of said O-ring shaped circlip, so that the outer periphery of the disc, which is fitted on the wheel hub, is able to pass axially over the circlip only when a axial force is exerted thereon.

This invention will be now more particularly described with reference to the annexed drawing, in which.

Figure 1:
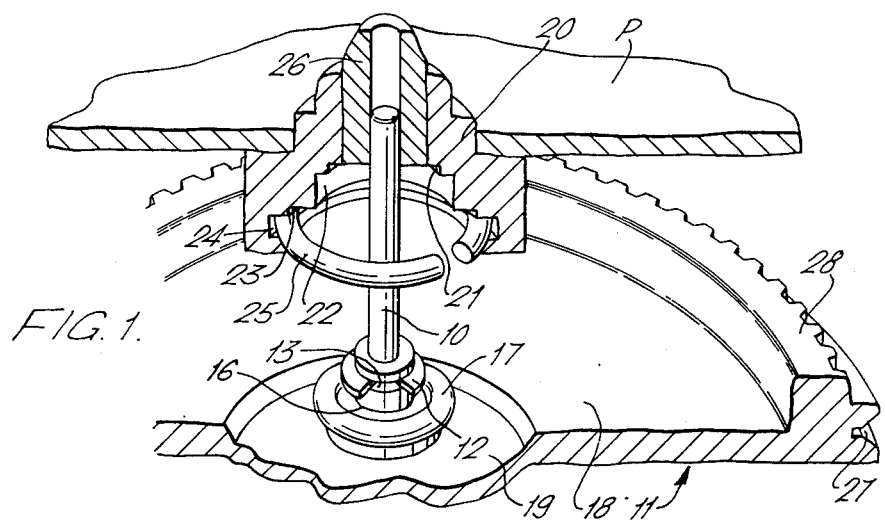
FIG. 1, is an exploded perspective view, with parts cut away for clearness, of the device as used to self-center and fasten against axial movements the flywheel of cassette type tape recorders, on a wall or a like stationary plate of the recorder housing.
Figure 2:
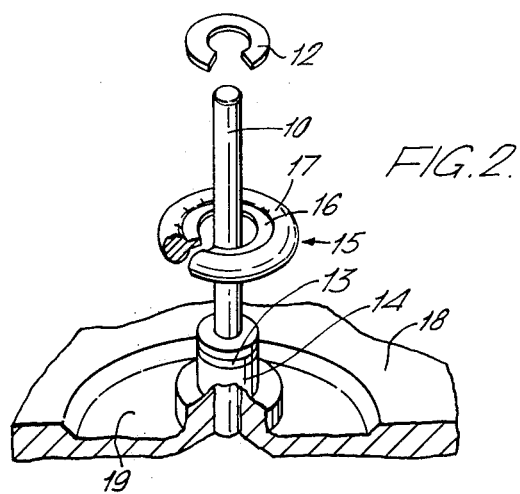
FIG. 2 is an exploded perspective view, with parts partially cut away for clearness, of the flywheel shaft base.

As viewed from FIG. 1, an annular element 15 is fixed to the base of shaft 10 of flywheel 11 by a circlip 12 adapted to be received in groove 13 on sleeve 14, annular element 15 having a flat disc-shaped flange 16 and a torus-shaped periphery 17.

The base of shaft 10, comprising the sleeve 14, is rigidly connected to the disc-shaped portion 18 of flywheel 11, which is depressed as indicated by 19.

On fixed wall P of the tape recorder, a bush 20 is supported having an inner surface comprising three cylindrical portions 21, 22, 23 of increasing diameter forming a series of steps, with the diameter of inner cylindrical surface of portion 23 slightly larger than the outer diameter of peripheral torus-shaped portion 17 of annular element 15.

A groove 24 is formed throughout the inner cylindrical surface of portion 23, in which groove a resilient split ring 25 is received, having an inner diameter less than the outer diameter of peripheral torus-shaped portion 17 of element 15; moreover the depth of groove 24 is such that resilient ring 25 is able to freely expand therein.

From the foregoing, the self-centering and fastening action of bush 20 on flywheel 11 will be evident. It will be noted also that fastening of flywheel 11 is obtained by a snap action of annular element 15 over circlip 25 and, of course, this is true also for the opposite operation, i.d. for releasing flywheel 11 from bush 20, for instance, in order to remove the same.

Indeed, in order to assemble and fasten flywheel 11 in place against axial movements it will be sufficient to fit shaft 10 in the bore of sleeve 26 rigidly connected to bush 20, until periphery 17 of annular element 15 abuts against split ring 25 and then to exert an axially directed pressure to cause split ring 25 to resiliently expand in groove 24 and thus to let element 15 pass over the same and seat in the bore of cylindrical portion 23 of bush 20.

Figure 3:
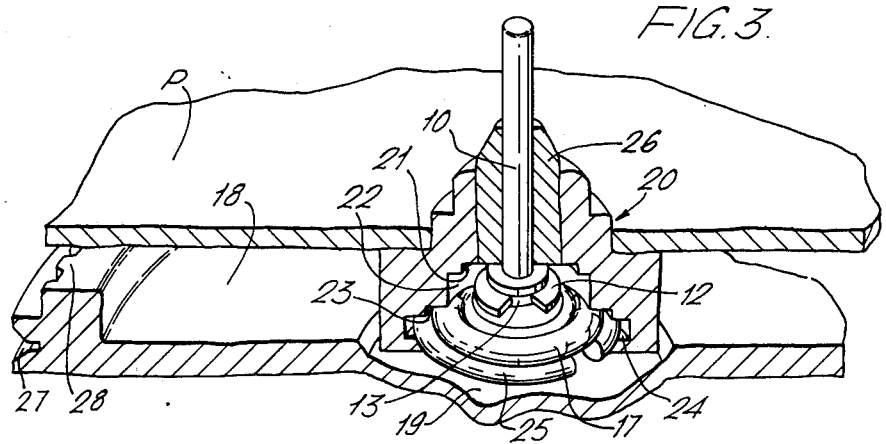
FIG. 3 is a similar view to FIG. 1, showing the flywheel fastened in place.

After element 15 is passed, split ring 25 will contract or narrow again and therefore flywheel 11 will be fastened in place both against axial and lateral movements, as shown in FIG. 3.

Of course, to remove flywheel 11 from bush 20 it will be necessary to operate inversely, i.e. to exert on flywheel 11 an axial force directed in the opposite direction.

Sleeve 26 preferably comprises a self-lubricating plastic bush.

For instance the torque to flywheel 11, which, of course, is freely rotating, can be transmitted through a belt (not shown) received in race 27 and the torque can be taken from flywheel 11 by a gear (not shown) meshing with peripheral gear 28.

It is evident that the device of the invention, which has been described and illustrated as applied to a flywheel in a cassette-type tape recorder, can be used to center and fasten against axial movements all wheels or rotating members.

It will be understood that the invention is by no means restricted to the particular embodiment thereof herein shown and described and the invention can be carried out with different parts and/or combinations of parts.

For instance, in place of the split ring, the fastening snap action on the torus-shaped ring inside the bush can be obtained through two or more spring biased pins having heads radially protruding from the inner cylindrical surface of the portion having the largest diameter, said two pins being received in radially extending seats and able to resiliently yield in order to allow the torus shaped ring pass and then to protrude again from said inner surface.

I claim:

1. A device for centering and fastening a rotating body against axial movements on a stationary mounting member comprising: a cylindrical sleeve rigidly connected to said rotating body and concentric thereto; an annular member, having a central opening and a torus-shaped periphery, adapted to be loosely fitted on said sleeve and held thereon by retaining means; a bush rigidly mounted on said stationary mounting member and having an inner cylindrical surface, the end portion of said inner cylindrical surface being of such diameter and axial extension to freely receive said cylindrical sleeve and said annular member thereon, and resilient retaining means mounted on said bush and protruding from said inner cylindrical surface of said end portion, said resilient retaining means having a diameter less than said torus-shaped periphery, capable of resiliently yielding to allow said torus-shaped periphery to pass when the latter is forced against said resilient retaining means by an axially directed force, and snapping again into its protruding position after said periphery is passed.

2. The device of claim 1, wherein in said end portion of said bush inner cylindrical surface an annular groove is formed, said resilient retaining means comprising a split spring ring of circular cross-section received in said groove to protrude therefrom by half of its diameter inside said inner cylindrical surface and to freely expand therein when said torus-shaped periphery of said annular member is axially forced against said split ring and to resiliently snap in the protruding position after said torus-shaped periphery is passed.

3. The device of claim 2, wherein a sleeve preferably of a self-lubricating plastic material is fitted in the end portion of said bush opposite to said portion wherein said groove is formed, said sleeve being intended to receive a mounting shaft of said rotating body.

4. The device of claim 1, wherein said rotating body is the flywheel of a portable tape recorder and said mounting member is a wall of the housing of said tape recorder.

* * * * *